(12) United States Patent
Uchiyama et al.

(10) Patent No.: US 8,031,238 B2
(45) Date of Patent: Oct. 4, 2011

(54) IMAGE-CAPTURING APPARATUS, IMAGE-CAPTURING METHOD, AND COMPUTER PROGRAM PRODUCT

(75) Inventors: Hiroaki Uchiyama, Kanagawa (JP); Seiji Nagao, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 533 days.

(21) Appl. No.: 12/039,386

(22) Filed: Feb. 28, 2008

(65) Prior Publication Data

US 2008/0225128 A1    Sep. 18, 2008

(30) Foreign Application Priority Data

Mar. 13, 2007   (JP) ................................ 2007-062958

(51) Int. Cl.
*H04N 5/76* (2006.01)
*H04N 7/00* (2011.01)
*H04N 7/18* (2006.01)

(52) U.S. Cl. ................ 348/231.3; 348/231.99; 348/116; 348/113

(58) Field of Classification Search .. 348/231.99–231.9, 348/113–120
See application file for complete search history.

(56) References Cited

U.S. PATENT DOCUMENTS

| 6,819,356 | B1 * | 11/2004 | Yumoto ..................... 348/231.2 |
| 2002/0076220 | A1 * | 6/2002 | Takahashi ..................... 396/429 |
| 2005/0073594 | A1 * | 4/2005 | Tagawa ..................... 348/231.3 |
| 2006/0023261 | A1 * | 2/2006 | Kaminaga ..................... 358/302 |
| 2006/0044417 | A1 * | 3/2006 | Tashiro et al. ............. 348/231.3 |
| 2006/0187317 | A1 * | 8/2006 | Montulli et al. ........... 348/231.5 |
| 2006/0221190 | A1 * | 10/2006 | Limberis et al. ........... 348/207.1 |
| 2008/0133124 | A1 * | 6/2008 | Sarkeshik ..................... 701/201 |
| 2009/0102979 | A1 * | 4/2009 | Matsuoka et al. ............ 348/725 |

FOREIGN PATENT DOCUMENTS

| JP | 2004-357343 | 12/2004 |
| JP | 2007-202110 | 8/2007 |
| JP | 2007-218896 | 8/2007 |

* cited by examiner

*Primary Examiner* — Sinh Tran
*Assistant Examiner* — Christopher K Peterson
(74) *Attorney, Agent, or Firm* — Oblon, Spivak, McClelland, Maier & Neustadt, L.L.P.

(57) ABSTRACT

In an image-capturing apparatus, recorded position information is stored upon receiving instruction of storing the recorded position information, and real-time position information is stored upon a photograph is taken, which is stored together with a captured-image. The image-capturing apparatus executes mode changeover from a recorded position information use mode to a real-time position information use mode when a timing of the mode changeover matches a mode change condition.

19 Claims, 11 Drawing Sheets

IMAGE-CAPTURING APPARATUS, IMAGE-CAPTURING METHOD, AND COMPUTER PROGRAM PRODUCT

CROSS-REFERENCE TO RELATED APPLICATIONS

The present application claims priority to and incorporates by reference the entire contents of Japanese priority document 2007-062958 filed in Japan on Mar. 13, 2007.

BACKGROUND OF THE INVENTION

1. Field of the Invention

The present invention relates to an image-capturing apparatus, an image-capturing method, and a computer program product, capable of obtaining position information.

2. Description of the Related Art

In recent years, widespread use of a portable GPS (Global Positioning System) receiver has lead to wider use of a GIS (Geographic Information Service) system utilizing position information. The GIS system is used in various fields in grasping the situation of disasters, handling real estate affairs, executing road works, and the like, thus expected to meet increasing market demands in future.

The GIS system often requires the use of a digital camera. For example, in the use of the GIS system for investigation of the situation of a disaster scene, the situation of a disaster-stricken area is photographed with a digital camera, and photographic data is associated with map data later to prepare a report or the like. In this manner, therefore, the GIS system brings a need of associating an image captured by the digital camera with information related to the image, such as photographing position information.

A technology that meets such a need is disclosed, for example, in Japanese Patent Application Laid-Open No. 2004-357343. According to the technology, a digital camera is connected to a GPS receiver, and position information from the GPS receiver is input to the digital camera, at which the position information (GPS information) is included in the header of a captured image. Through this technology, the position information of the captured image is recorded in the same image file containing the captured image, which achieves more efficient image management.

The GPS receiver, however, can usually be used only in the outdoor environment. This poses a problem, for example, that position information cannot be recorded in image data of the image photographed inside a building.

Moreover, photographing such a subject as tall building accompanying difficulty in photographing an overall view of the subject from a place close to the subject also poses a problem that the subject needs to be photographed from a place distant from the subject, so that exact position information of the subject cannot be recorded in image data when position information at the time of photographing is recorded in the image data.

Furthermore, recording direction information at the time of photographing in image data also poses a problem of a need of expensive equipment, such as an electronic compass.

SUMMARY OF THE INVENTION

It is an object of the present invention to at least partially solve the problems in the conventional technology.

According to an aspect of the present invention, there is provided an image-capturing apparatus including a position obtaining unit that obtains position information indicative of a position of the image-capturing apparatus; an instruction receiving unit that receives an instruction for instructing storing of the position information; a recorded position storing unit that stores therein position information obtained by the position obtaining unit as first position information upon the instruction receiving unit receives the instruction; a real-time position storing unit that stores therein position information obtained by the position obtaining unit as second position information upon a photograph is taken; a storing unit that stores at least one of the first position information and the second position information, together with a captured-image as image data; a change condition setting unit that sets a change condition on timing of mode changeover from a recorded position information use mode for storing the first position information together with a captured-image to a real-time position information use mode for storing the second position information together with a captured-image; and a mode control unit that executes mode changeover from the recorded position information use mode to the real-time position information use mode when a timing of mode changeover from the recorded position information use mode to the real-time position information use mode matches the change condition.

According to another aspect of the present invention, there is provided an image-capturing method that is implemented on an image forming apparatus including obtaining position information indicative of a position of the image-capturing apparatus; receiving an instruction for instructing storing of the position information; storing position information obtained at the obtaining as first position information upon the instruction is received; storing position information obtained at the obtaining as second position information upon a photograph is taken; storing at least one of the first position information and the second position information, together with a captured-image as image data; setting a change condition on timing of mode changeover from a recorded position information use mode for storing the first position information together with a captured-image to a real-time position information use mode for storing the second position information together with a captured-image; and executing mode changeover from the recorded position information use mode to the real-time position information use mode when a timing of mode changeover from the recorded position information use mode to the real-time position information use mode matches the change condition.

According to still another aspect of the present invention, there is provided a computer program product including a computer usable medium having computer readable program codes embodied in the medium that, when executed, causes an image-capturing apparatus to execute the above image-capturing method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image-capturing apparatus, an image-capturing method, and a program according to the present invention are explained in detail below with reference to the accompanying drawings. In the present embodiments, the image-capturing apparatus of the present invention is provided in application to a digital camera. Application of the present invention, however, is not limited to this case, but the present invention can also be applied to various devices having an image-capturing function, such as a portable terminal unit.

Figure 1:
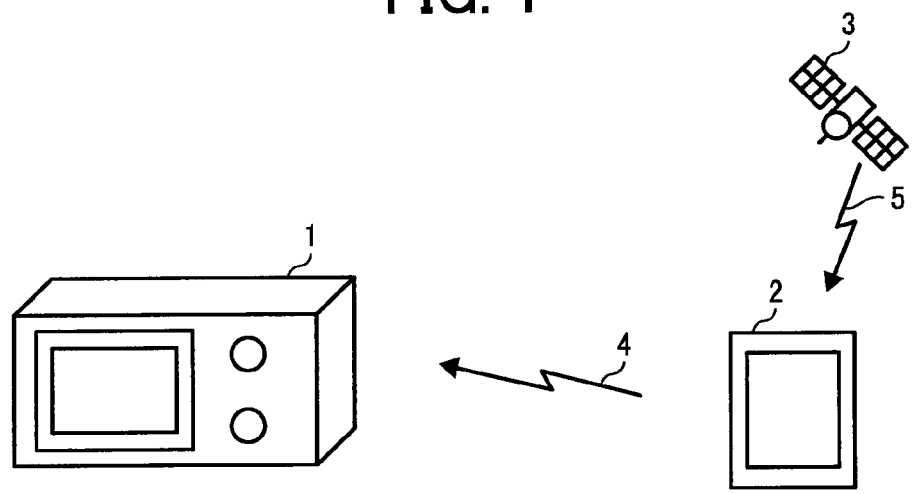
FIG. 1 is a schematic diagram of a GIS system.

FIG. 1 is a schematic diagram of a GIS system. The GIS system of the present embodiment includes a digital camera 1, a GPS receiver 2 conforming to the Bluetooth (registered trademark) standard, and a GPS satellite 3 for capturing position information.

The digital camera 1 includes a communication device that obtains position information from the GPS receiver 2. In the present embodiment, the communication device is provided as a radio transmitter/receiver conforming to the Bluetooth (registered trademark) standard. The digital camera 1 is connected to the GPS receiver 2 via a communication medium 4. The GPS receiver 2 is connected to the GPS satellite 3 via a GPS communication medium 5.

The communication medium 4 is a radio communication system, such as Bluetooth (registered trademark), and can be provided as a cable for wired communication, such as RS232C cable, instead of the radio communication system. When a Compact Flash (registered trademark) card is used as a photographing position detector instead of the GPS receiver 2, the communication medium 4 corresponds to the connection between the Compact Flash (registered trademark) card and the digital camera 1.

Figure 2:
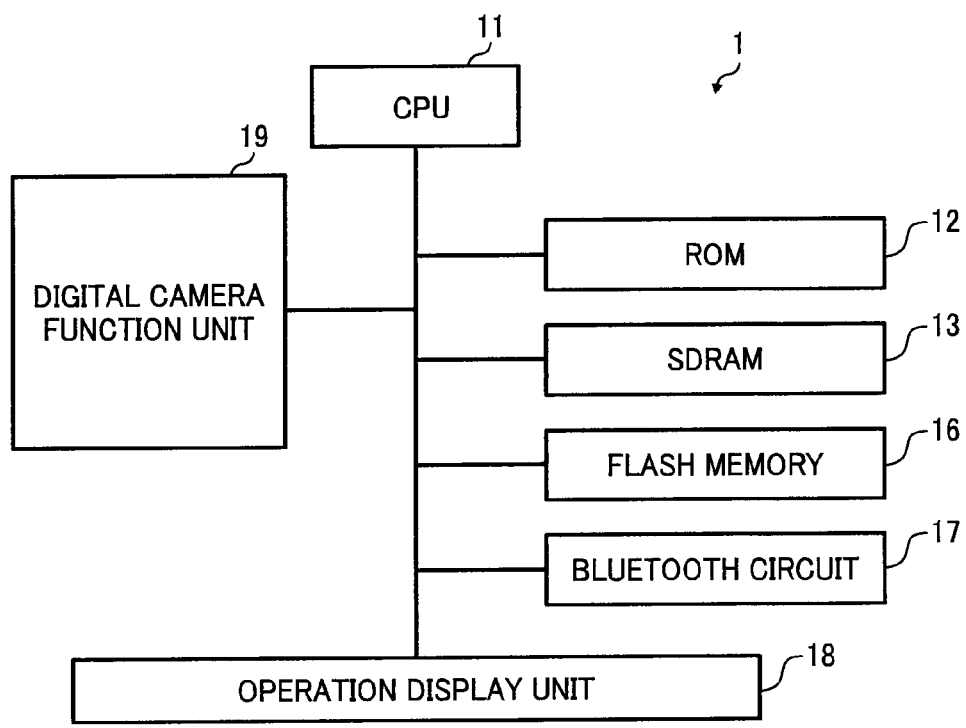
FIG. 2 is a block diagram of a hardware configuration of a digital camera according to embodiments of the present invention.

FIG. 2 is a block diagram of a hardware configuration of the digital camera 1 according to the present embodiment. In the digital camera 1, a central processing unit (CPU) 11 controls the entire part of the digital camera 1. A read only memory (ROM) 12 has stored therein computer programs that achieve control according to the present embodiment. A synchronous dynamic random access memory (SDRAM) 13 is a storage medium that is capable of storing therein position information (GPS position information) obtained through reception by the GPS receiver 2, direction information calculated from the position information, and a position information use mode changeover condition.

A flash memory (nonvolatile memory) 16 is a storage medium that stores therein setup information on the digital camera 1, setting information on a position information use mode, and image data.

A Bluetooth (registered trademark) circuit 17 is a communication circuit capable of radio transmission/reception by a communication method conforming to the Bluetooth (registered trademark) standard. In the present embodiment, the Bluetooth (registered trademark) circuit 17 serves as a communication device that obtains position information from the GPS receiver 2.

An operation display unit 18 is an interface capable of displaying captured images and various screens, and includes, for example, a liquid crystal display, a key button, a shutter button, and a mode dial.

Figure 3:
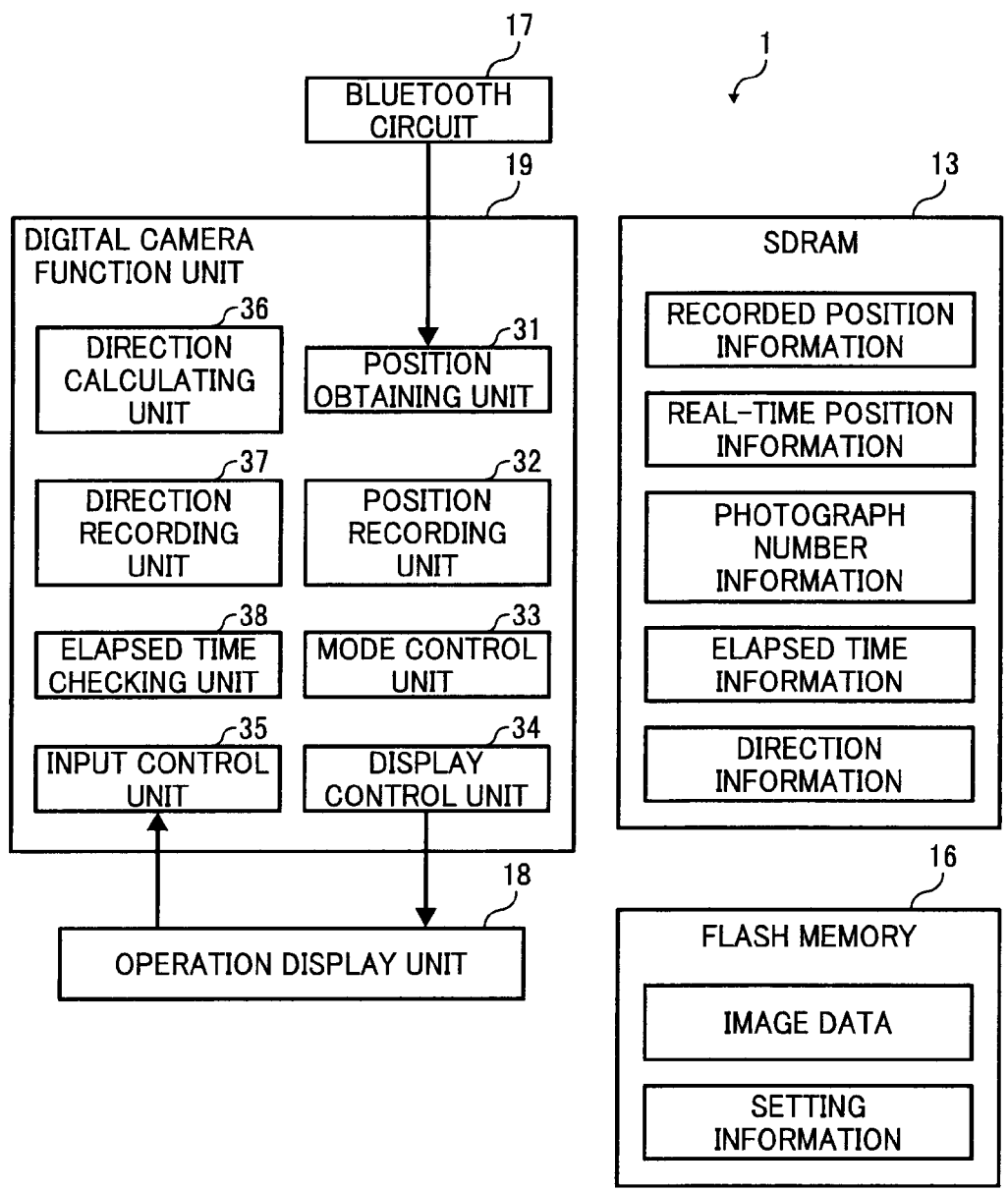
FIG. 3 is a functional block diagram of a software configuration of a digital camera function unit in FIG. 2.

A digital camera function unit 19 is a processing unit including an image-capturing function and a position information recording function. FIG. 3 is a functional block diagram of a software configuration of the digital camera function unit 19. As shown in FIG. 3, the digital camera function unit 19 includes a position obtaining unit 31, a position recording unit 32, a mode control unit 33, a display control unit 34, an input control unit 35, a direction calculating unit 36, a direction recording unit 37, and an elapsed time checking unit 38.

The position obtaining unit 31 is the processing unit that obtains the current position information from the GPS receiver 2 via the Bluetooth circuit 17 at every given time to store obtained position information in the SDRAM 13.

The position obtaining unit 31 stores obtained information in the SDRAM 13 in recoding timing of reception of operation input of a recording command by a user from the operation display unit 18.

Position information obtained by the position obtaining unit 31, specifically, is data including an element of latitude and longitude, is stored temporarily in the SDRAM 13 as real-time position information, and is also stored in the SDRAM 13 for a given period as recorded position information.

The position obtaining unit 31 carries out a process of deleting recorded position information stored in the SDRAM 13 in deletion timing of reception of operation input of a deletion command by a user from the operation display unit 18 or at the point in time of changeover of the position information use mode based on the mode change condition.

The mode control unit 33 is the processing unit that carries out mode setting by storing the position information use mode in the flash memory 16 as setting information. The mode control unit 33 also controls changeover of the position information use mode by storing the mode change condition in the flash memory 16 as setting information.

The position information use mode includes a real-time position information use mode, a recorded position information use mode, and a position information combined use mode.

The real-time position information use mode is the mode in which only the position information obtained by the position obtaining unit 31 on photographing is recorded in an Exif (Exchangeable Image File Format) header of image data in real-time processing.

The recorded position information use mode is the mode in which position information stored in the SDRAM 13 as recorded position information is recorded in the Exif header of image data, regardless of whether the position obtaining unit 31 can detect position information.

The position information combined use mode is the mode in which recording of position information detected on photographing in the Exif header of image data or recording of position information stored in the SDRAM 13 as recorded position information in the Exif header of image data is carried out selectively.

Figure 4:
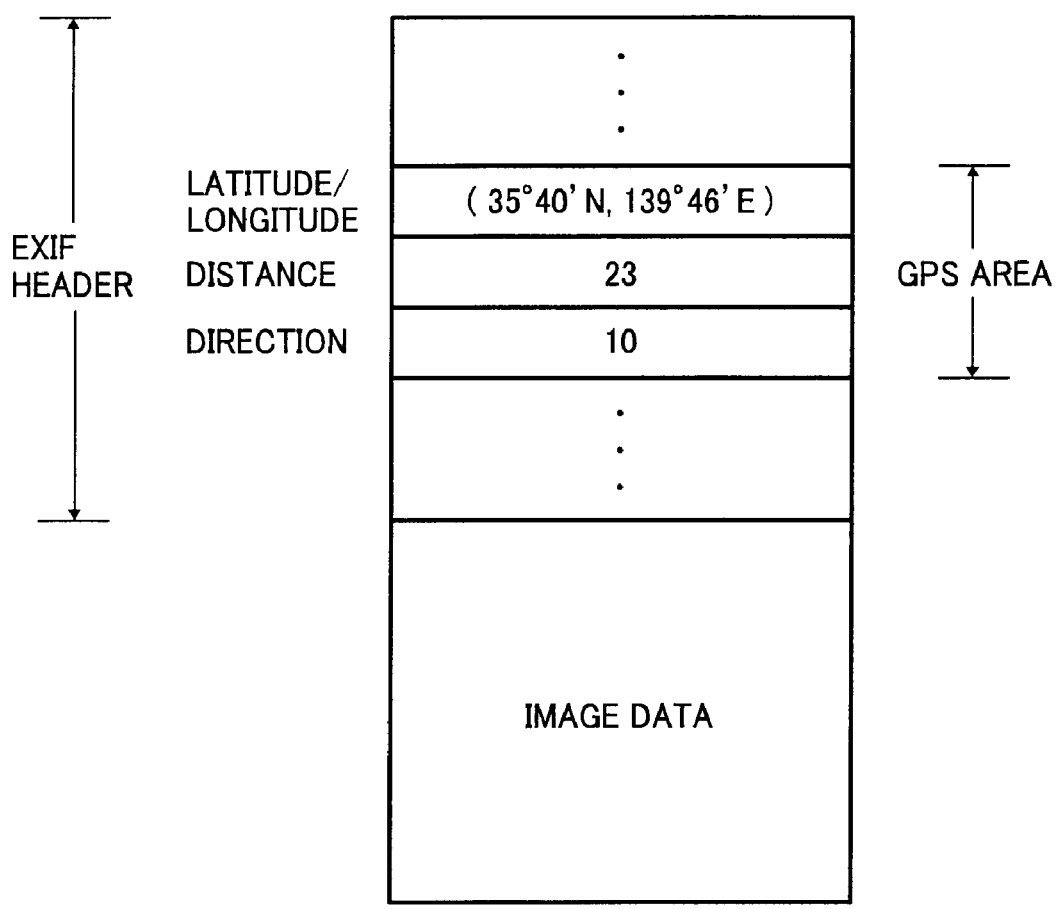
FIG. 4 is a structural diagram of image data.

FIG. 4 is a structural diagram of image data. As shown in FIG. 4, the image data includes the Exif header and the captured image. The Exif header represents header information conforming to the data format of Exif. The Exif header includes a GPS area containing a latitude/longitude field that has recorded therein position information obtained from the position obtaining unit 31 and direction information calculated from the position information.

Each mode of the position information use mode is selected through setting input by a user from the operation display unit 18.

The mode control unit 33 carries out a control process for mode changeover to the recorded position information use mode by storing the recorded position information use mode in the flash memory 16 as the position information use mode when the position obtaining unit 31 records position information in the SDRAM 13.

Moreover, the mode control unit 33 carries out a control process for mode changeover to the position information combined use mode by storing the position information combined use mode in the flash memory 16 as the position information use mode when the position obtaining unit 31 records position information in the SDRAM 13.

Furthermore, the mode control unit 33 carries out a control process for mode changeover from the position information combined use mode or the recorded position information use mode to the real-time position information use mode based on the mode change condition preset by a user. The mode change condition includes a photograph number condition and a timer condition.

The photograph number condition is the condition for execution of mode changeover from the position information combined use mode or the recorded position information use mode to the real-time position information use mode when the number of image data containing recorded position information reaches the number of photographs preset on the flash memory 16 after reception of operation input of a recording command by a user from the operation display unit 18.

For example, when a user sets the photograph number condition of one, and one photograph is taken right after the user gave a command of recording position information via the operation display unit 18, recorded position information is recorded in the Exif header of image data. The number of image data containing the recorded position information is managed by the SDRAM 13 as photograph number information, which is incremented by one every time the recorded position information is recorded in the Exif header of image data. When the number of the photograph number information reaches the number of photographs (one, in this case) set on the flash memory 16 as the photograph number condition, the mode control unit 33 carries out mode changeover to the real-time position information use mode by storing the real-time position information use mode in the flash memory 16 as the position information use mode. In the above case, therefore, position information obtained in real-time processing by the position obtaining unit 31 is recorded in the Exif header of image data containing a captured image from the second photographing onward.

The timer condition is the condition for execution of mode changeover from the position information combined use mode or the recorded position information use mode to the real-time position information use mode when an elapsed time after recording of recorded position information in image data reaches a set time preset on the flash memory 16 after reception of operation input of a recording command by a user from the operation display unit 18.

For example, when a user sets the timer condition of one minute, and the first photographing is carried out after the user gave a command of recording position information via the operation display unit 18, recorded position information is recorded in the Exif header of image data. An elapsed time after recording of the recorded position information in image data is managed by the SDRAM 13 as elapsed time information, which is updated by the elapsed time checking unit 38. When the elapsed time represented by the elapsed time information reaches the set time (one minute, in this case) set as the timer condition on the flash memory 16, the mode control unit 33 carries out mode changeover to the real-time position information use mode by storing the real-time position information use mode in the flash memory 16 as the position information use mode. In the above case, therefore, position information obtained in real-time processing by the position obtaining unit 31 is recorded in the Exif header of image data containing a captured image from photographing after the lapse of one minute.

Setting of each mode change condition (photograph number condition and timer condition) is carried out through setting input by a user from the operation display unit 18.

The position recording unit 32 is the processing unit that records recorded position information or real-time position information, which is stored in the SDRAM 13, in the Exif header of image data when a captured image is stored in the flash memory 16. As a result, the captured image is stored together with position information in the flash memory 16.

Specifically, when the real-time position information use mode is set as setting information, the position recording unit 32 records real-time position information obtained upon photographing by the position obtaining unit 31 in the Exif header of image data.

When the recorded position information use mode is set as setting information, the position recording unit 32 records position information stored in the SDRAM 13 as recorded position information in the Exif header of image data.

When the position information combined use mode is set as setting information, and the position obtaining unit 31 can detect position information because a user is outdoor, the position recording unit 32 records real-time position information detected upon photographing in the Exif header of image data. When the position information combined use mode is set as setting information, and the position obtaining unit 31 cannot detect position information because a user is indoor, the position recording unit 32 records recorded position information stored in the SDRAM 13 in the Exif header of image data.

The display control unit 34 is the processing unit that carries out control for display of screens and data on a liquid crystal display of the operation display unit. The screens and data include a setup screen for obtaining and recording GPS position information and specifying the use or nonuse of a GPS function of obtaining and recording direction information, a setup screen for inputting setting on the position information use mode, a setup screen for inputting setting on timing of deleting recorded position information from the SDRAM 13, a setup screen for inputting change of the position information use mode, a setup screen for inputting the mode change condition for mode changeover from the recorded position information use mode to the real-time position information use mode, a setup screen for inputting detailed setting on each mode change condition, and image data containing position information and direction information displayed thereon.

Figure 5:
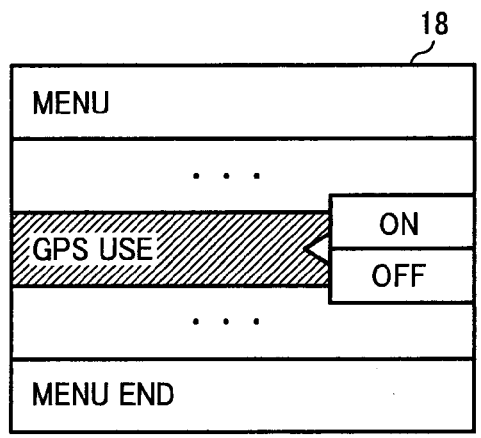
FIG. 5 is a schematic diagram of an example of a setup screen for specifying the use or nonuse of a GPS function of obtaining and recording position information.

FIG. 5 is a schematic diagram of an example of a setup screen for specifying the use or nonuse of the GPS function of obtaining and recording position information. An item of "GPS position information recording" for setting the use or nonuse of the GPS function of obtaining and recording position information is displayed on the setup screen, where ON or OFF can be selected on the item. Such specification of the use or nonuse of the GPS function is stored directly in the flash memory 16 as setting information indicating the use or nonuse of the function of obtaining and recording position information.

Figure 6:
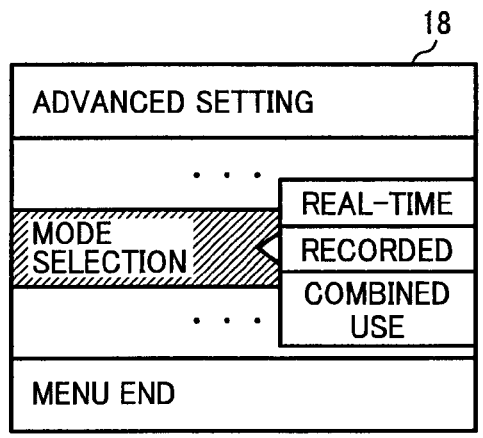
FIG. 6 is a schematic diagram of an example of a setup screen for inputting setting on a position information use mode.

FIG. 6 is a schematic diagram of an example of a setup screen for inputting setting on the position information use mode. As shown in FIG. 6, specifying "mode selection" results in display of items of "real-time" for selection of the real-time position information use mode, "recorded" for selection of the recorded position information use mode, and "combined use" for selection of the position information combined use mode, any one of which items is then specified.

Figure 7:
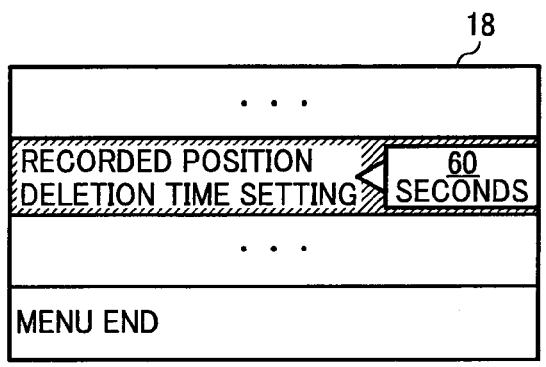
FIG. 7 is a schematic diagram of an example of a setup screen for inputting setting on timing of deleting recorded position information from a SDRAM.

FIG. 7 is a schematic diagram of an example of a setup screen for inputting setting on timing of deleting recorded position information from the SDRAM 13. As shown in FIG. 7, a user is allowed to input an elapsed time after recording of position information on an item of "recorded position deletion timing". The elapsed time is stored in the flash memory 16 as setting information. The position obtaining unit 31, after recording position information in the SDRAM 13 as recorded position information, checks the setting information to delete the recorded position information from the SDRAM 13 after the elapsed time has passed from the time of recording the position information.

Figure 8:
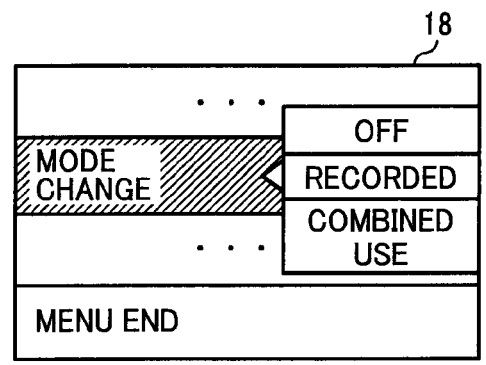
FIG. 8 is a schematic diagram of an example of a setup screen for inputting specified mode for mode changeover.

FIG. 8 is a schematic diagram of an example of a setup screen for inputting specified mode for mode changeover. As shown in FIG. 8, an item of "mode change" has subitems displayed thereon, which includes "OFF", "recorded", and "combined use". When "OFF" is set, the setting is stored in the flash memory 16 as setting information. The mode control unit 33 carries out control for mode changeover to the real-time position information use mode when the setting information is "OFF", to the recorded position information use mode when the setting information is "recorded", and to the position information combined use mode when the setting information is "combined use".

The display control unit 34 changes the color of characters expressing position information depending on whether the position obtaining unit 31 can obtain position information, and displays the position information in changed color on the operation display unit 18. Specifically, the display control unit 34 displays the position information in white when the position information is obtainable, changes the color of real-time position information already on display to orange when the position information is unobtainable, and displays the position information in blue when position information stored in the SDRAM 13 as recorded position information is displayed.

Figure 9:
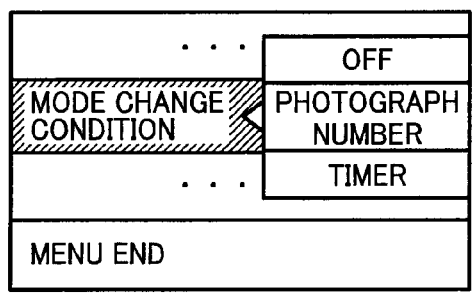
FIG. 9 is a schematic diagram of an example of a setup screen for inputting setting on a mode change condition.

FIG. 9 is a schematic diagram of an example of a setup screen for inputting setting on the mode change condition. As shown in FIG. 9, an item of "mode change condition" has subitems including "OFF", "photograph number condition", and "timer condition". When "OFF" is set, the setting is stored in the flash memory 16 as setting information. The mode control unit 33 does not carry out mode changeover based on the mode change condition when the setting information is "OFF". The mode control unit 33, when the setting information is "photograph number condition", carries out mode changeover to the real-time position information use mode at the point that the number of image data containing recorded position information reaches the number of photographs set on the flash memory 16 as the photograph number condition. The mode control unit 33, when the setting information is "timer condition", carries out mode changeover to the real-time position information use mode at the time that an elapsed time after reception of operation input of a recording command by a user from the operation display unit 18 and recording of recorded position information in image data reaches a set time set on the flash memory 16 as the timer condition.

Figure 10:
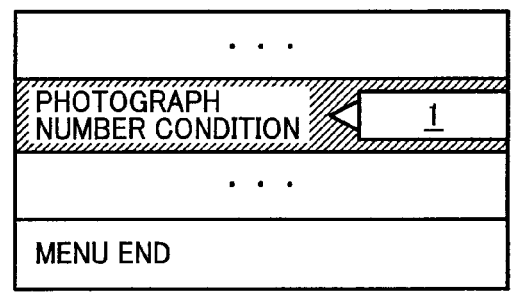
FIG. 10 is a schematic diagram of an example of a setup screen for inputting setting on a photograph number condition.
Figure 11:
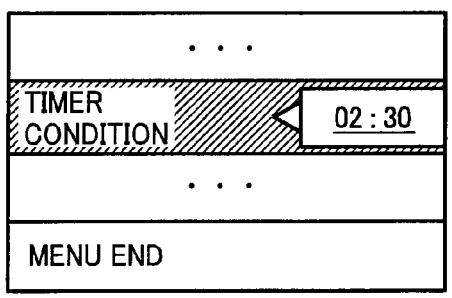
FIG. 11 is a schematic diagram of an example of a setup screen for inputting setting on a timer condition.

FIGS. 10 and 11 are schematic diagrams of examples of setup screens for inputting setting on the photographing condition and the timer condition. As shown in FIGS. 10 and 11, a user is allowed to input the number of photographs or a set time for mode change on an item of "mode change condition (a photograph number condition or a timer condition)". The number of photographs or the set time is stored in the flash memory 16 as setting information, and the mode control unit 33 carries out mode changeover from the position information combined use mode or the recorded position information use mode to the real-time position information use mode based on the photograph number condition or the timer condition.

Figure 12:
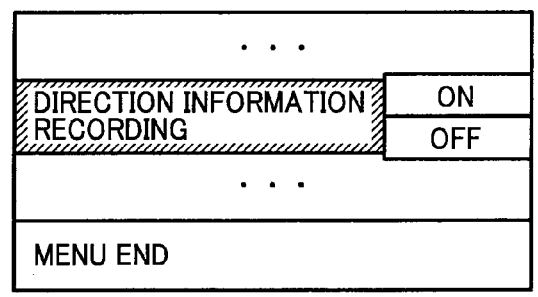
FIG. 12 is a schematic diagram of an example of a setup screen for specifying the use or nonuse of a function of recording direction information.

FIG. 12 is a schematic diagram of an example of a setup screen for specifying the use or nonuse of a function of calculating and recording direction information by the direction calculating unit 36 and the direction recording unit 37. An item of "GPS direction information recording" for setting the use or nonuse of the function of obtaining and recording direction information is displayed on the setup screen, where ON or OFF can be selected. Such specification of the use or nonuse of the function is stored directly in the flash memory 16 as setting information indicating the use or nonuse of the function of obtaining and recording direction information.

The input control unit 35 is the processing unit that receives input and commands from the operation display unit 18, the input and commands including commands of recording position information and direction information, input for setting deletion timing, input for setting each mode of the position information use mode, input for setting mode changeover, input for setting the mode change condition, and input for setting the photograph number condition or the timer condition.

The direction calculating unit 36 is the processing unit that calculates direction information from position information of a subject recorded in the SDRAM 13 as recorded position information and position information captured at a point of photographing the subject, and that stores the calculated direction information in the SDRAM 13.

Specifically, after the position recording unit 32 has recorded position information in the Exif header of image data, the direction calculating unit 36 determines on whether to calculate direction information based on setting information on the use or nonuse of the GPS function of obtaining and recording direction information. The setting information is stored in the flash memory 16. When the use of the GPS function of obtaining and recording direction information is set, the direction calculating unit 36 calculates the direction information from the position information of the subject recorded in the SDRAM 13 as recorded position information and the position information captured at the point of photographing the subject, and stores the calculated direction information in the SDRAM 13.

The direction recording unit 37 is the processing unit that records direction information stored in the SDRAM 13 together with position information in the Exif header of image data. As a result, the image data is stored in the flash memory 16, together with the position information and direction information.

The elapsed time checking unit 38 checks an elapsed time after recording of recorded position information in the Exif header of image data after reception of operation input of a recording command by a user from the operation display unit 18, and updates elapsed time information managed by the SDRAM 13, using the checked elapsed time.

Figure 13:
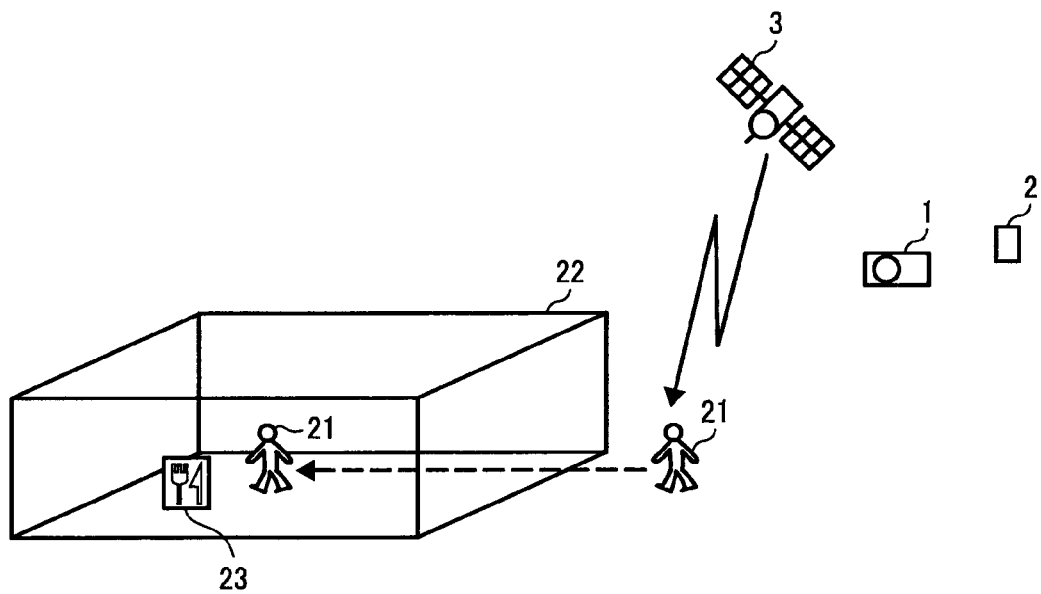
FIG. 13 is an explanatory view of one form of use of a digital camera according to a first embodiment of the present invention.

In a first embodiment, as described above, GPS information is added to image data in an environment where GPS information cannot be captured, especially in an indoor environment. FIG. 13 is an explanatory view of one form of use of the digital camera according to the present embodiment.

A user 21 desires to photograph a subject 23 (e.g., a restaurant in a building 22) with position information in the building 22. A conventional system, however, is not capable of capturing the position information in the building 22 because radio waves from the GPS satellite 3 do not reach the subject in the building 22.

In the present embodiment, the user 21 first captures the position information outside the building 22, using the GPS receiver 2. Upon capturing the position information, the user 21 records the position information (GPS information) on the spot in the SDRAM 13 of the digital camera 1 as recorded position information. Thereafter, the user 21 enters the building 22, and photographs the subject 23. At this time, the recorded position information captured outside the building 22 is recorded in the header of image data.

Figure 14:
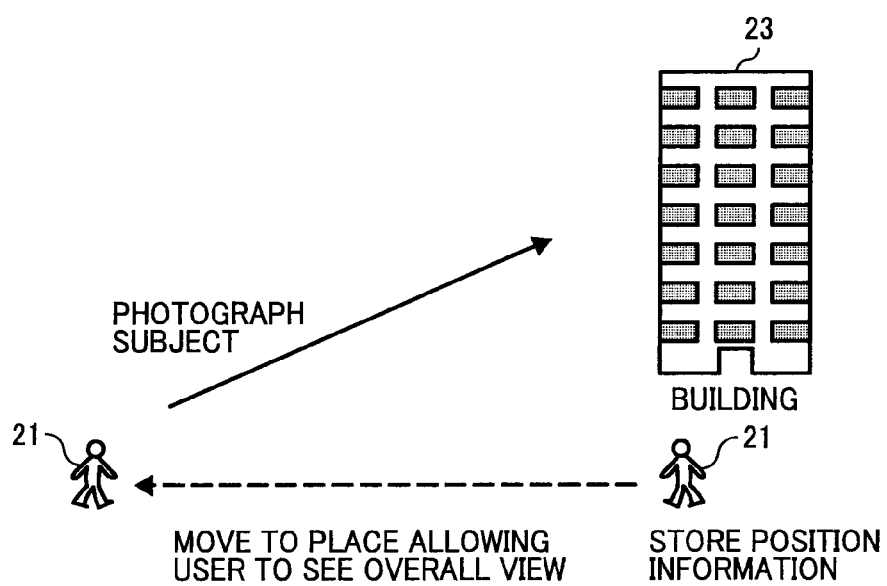
FIG. 14 is an explanatory view of another form of use of the digital camera according to the first embodiment.

Furthermore, in the present embodiment, for example, even when an overall view of such a subject as a tall building is photographed from a place distant from the subject to cover the overall view of the subject, exact GPS information on the position of the subject is added to image data. FIG. 14 is an explanatory view of another form of use of the digital camera according to the present embodiment in a case of photographing an overall view of a subject from a place distant from the subject.

The user 21 desires to photograph an overall view of the subject 23 (e.g., large building) with position information. In a conventional system, however, the user needs to move to a place apart from the subject 23 by a certain distance and photograph the subject 23 from there to cover the overall view of the subject 23. In the conventional system, therefore, position information of a photographing place added to image data does not match position information of the subject 23.

In the present embodiment, the user 21 first captures the position information near the subject 23, and records the captured position information of the subject 23 in the SDRAM 13 of the digital camera 1 as recorded position information. When the recorded position information is recorded in the SDRAM 13, the user moves to a place enabling photographing of the overall view of the subject 23, and photographs the subject 23. At this time, the recorded position information captured near the subject 23 is recorded in the header of image data.

Figure 15:
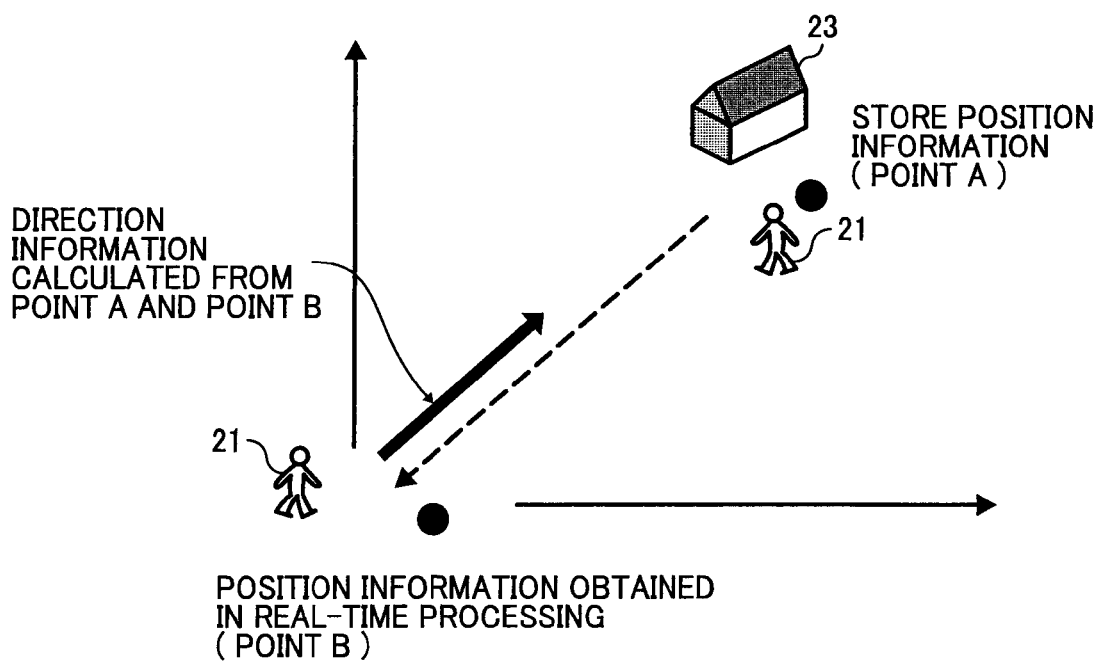
FIG. 15 is an explanatory view of one form of use of a digital camera according to a second embodiment of the present invention.

In a second embodiment, direction information calculated from position information of two points is recorded in image data without using a direction measuring instrument, such as an electronic compass. FIG. 15 is an explanatory view of the principle of adding direction information.

The user 21 first captures position information at the position of the subject 23 (point A), and records the captured position information in the SDRAM 13 of the digital camera 1 as recorded position information. The user 21 then moves to a photographing point (point B), where the user photographs the subject 23 with the digital camera 1. At this time, the digital camera 1 calculates direction information from the recorded position information of the point A recorded in the SDRAM 13 and position information of the point B, and records the calculated direction information in the header of image data.

An operation of the digital camera having the above configuration of the first embodiment is explained. FIGS. 16 and 17A to 17D are flowcharts of procedures of a position information recording process executed by the digital camera 1 of the present embodiment.

The user first turns on the power of the digital camera 1 (step S1) to start the digital camera 1, and then the digital camera 1 begins to connect with the GPS receiver 2 (step S2). The description referring to FIGS. 16 and 17A to 17D is made on the assumption that "ON (use)" is selected in specifying the use or nonuse of the GPS function of obtaining and recording position information as setting information. If "OFF" is selected, the following process is not executed.

In the present embodiment, the digital camera 1 and the GPS receiver 2 are connected via the Bluetooth (registered trademark) system. At step 2, therefore, Bluetooth (registered trademark) connection between the digital camera 1 and the GPS receiver 2 starts. Upon completing normal connection, the digital camera 1 starts obtaining position information from the GPS receiver 2. The position information is transmitted periodically (e.g., at every one second) from the GPS receiver 2 to the digital camera 1.

In one case, the user 21 tries to photograph the subject 23 with position information in the building 22. However, capturing the position information in the building 22 is impossible, so that the user 21 captures the position information in advance in front of the building 22. In another case, the user 21 tries to photograph the subject 23 with position information near the subject 23. However, the user 21 needs to photograph the subject 23 from a place distant from the subject 23 because the subject 23 is large. In this case, the user 21 captures the position information in advance in front of the subject 23.

In the above cases, the user 21 presses a given button or the like on the operation display unit 18 of the digital camera 1 to give a command of recoding the currently captured position information to the CPU 11 of the digital camera 1. When input of the recording command is received (Yes at step S3), the currently captured position information is recorded in the SDRAM 13 as recorded position information (step S4). The recorded position information recorded in the SDRAM 13 is automatically deleted by the position obtaining unit 31 when an elapsed time input on the setup screen of FIG. 7 has passed.

Then, the mode control unit 33 refers to the setting information in the flash memory 16 to identify the currently set position information use mode (step S5), and proceeds to a process loop depending on each mode of the position information use mode.

When the position information use mode is set in advance to "real-time position information use mode", mode changeover to "recorded position information use mode" or to "position information combined use mode" can be carried out automatically at the point that the user 21 records the recorded position information in the SDRAM 13 of the digital camera 1 (step S4). Execution or nonexecution of such automatic mode changeover at the point of recording of the recorded position information in the SDRAM 13 of the digital camera 1 can be set in advance on the above setup screen of FIG. 8.

Each mode of the position information use mode is explained.

In "real-time position information use mode", only the real-time position information captured in real-time processing is used. The position obtaining unit 31 determines on whether real-time position information is captured (step S7). When the GPS receiver 2 cannot capture the real-time position information because the user is indoor or other reasons (No at step S7), the display control unit 34 displays a message informing the user that the real-time position information cannot be captured on the operation display unit 18, or changes the color of characters of real-time position information to orange on the display if the real-time position information is already on display (step S8). Then, real-time position information is deleted from the SDRAM 13 (step S9), and the system control proceeds to step S11. In this case, because the content of the SDRAM 13 is deleted, position information is not recorded in image data at step S12 when the user carries out photographing at step S11.

When the GPS receiver 2 can capture the real-time position information at step S7 (Yes at step S7), the display control unit 34 displays the captured real-time position information in white on the operation display unit 18 of the digital camera 1. The displayed real-time position information is updated periodically depending on real-time position information received through the GPS receiver 2. The position obtaining unit 31 stores received position information in the SDRAM 13 as real-time position information (steps S10 and 10a). Then, when the user 21 carries out photographing (Yes at step S11), the real-time position information stored in the SDRAM 13 is recorded in the header of image data (steps S12 and 13).

When the position information use mode is set to "recorded position information use mode" at step S5, whether position information is recorded in the SDRAM 13 as recorded position information is checked first (step S14). When the recorded position information is recorded in the SDRAM 13 (Yes at step S14), the recorded position information is displayed in blue on the operation display unit 18 of the digital camera 1 (step S15).

When the recorded position information is not recorded in the SDRAM 13 at step S14 (No at step S14), the display control unit 34 displays a message that the recorded position information is not recorded in the SDRAM 13 on the operation display unit 18 of the digital camera 1 (step S17). Then, the mode control unit 33 refers to the setting information on the flash memory 16, and changes the current position information use mode into the position information combined use mode when the setting information indicates setting of "combined use" (step S18). If the setting information indicates setting other than "combined use", such mode change is not carried out.

The setting information can be provided as setting for automatic changeover to the real-time position information use mode, or as setting for not executing automatic changeover and recording nothing in the header of image data when the recorded position information is not recorded.

When the user 21 carries out photographing (Yes at step S16), the mode control unit 33 refers to setting information on the flash memory 16, checks which one of "OFF", "photograph number condition", and "timer condition" the mode change condition is set to, and proceeds to a process loop depending on each mode of the position information use mode (step S19). When the mode change condition is set to "OFF", mode changeover from "position information combined use mode" or "recorded position information use mode" to "real-time position information use mode" is not carried out, and the recorded position information stored in the SDRAM 13 is recorded in the header of image data (steps S12 and 13).

When the mode change condition is set to "photograph number condition", whether the photograph number condition of one or more is set on the flash memory 16 is checked (step S20). When the photograph number condition is set to one or more (Yes at step S20), photograph number information managed by the SDRAM 13 is incremented by one (step S21). When the photograph number information is incremented by one, whether the current count of the photograph number information is greater than the photograph number condition is checked (step S22). When the current count of the photograph number information is greater (Yes at step S22), the mode control unit 33 changes "recorded position information use mode" or "position information combined use mode" to "real-time position information use mode" in changing the position information use mode (step S23). Then, the recorded position information is deleted from the SDRAM 13, and the system control proceeds to step S3. In this case, because the content of the SDRAM 13 is deleted, recorded position information is not recorded in image data when the user carries out photographing at step S16. At this time, the display control unit 34 can display a message that recorded position information is not recorded on the operation display unit 18.

When the photograph number condition of one or more is not set on the flash memory 16 (step S20) and when the current count of the photograph number information is equal to or less than the photograph number condition (step S22), mode changeover from "recorded position information use mode" or "position information combined use mode" to "real-time position information use mode" is not carried out, and the recorded position information stored in the SDRAM 13 is recorded in the header of image data (steps S12 and 13).

When the mode change condition is set to "timer condition", whether the timer condition is set to any value other than zero on the flash memory 16 is checked (step S24). When the timer condition is set to any value other than zero (Yes at step S24), whether a time indicated by elapsed time information managed by the SDRAM 13 reaches a time indicated by the timer condition is checked (step S25). When the time indicated by the current elapsed time information reaches the time indicated by the timer condition (Yes at step S25), the mode control unit 33 changes "recorded position information use mode" or "position information combined use mode" to "real-time position information use mode" in changing the position information use mode (step S26). Then, the recorded position information is deleted from the SDRAM 13, and the system control proceeds to step S3. In this case, because the content of the SDRAM 13 is deleted, recorded position information is not recorded in image data when the user carries out photographing at step S16. At this time, the display control unit 34 can display a message that recorded position information is not recorded on the operation display unit 18.

When the timer condition of zero is set on the flash memory 16 (step S24) and when the time indicated by the current elapsed time information does not reach the time indicated by the timer condition (step S25), mode changeover from "recorded position information use mode" or "position information combined use mode" to "real-time position information use mode" is not carried out, and the recorded position information stored in the SDRAM 13 is recorded in the header of image data (steps S12 and 13).

At step S5, when the position information use mode is set to "position information combined use mode", the position obtaining unit 31 checks whether position information is captured at present (step S6). When the position information is captured (Yes at step S6), the display control unit 34 displays the captured position information with white characters on the operation display unit 18 (step S10). The displayed position information is updated periodically depending on position information received through the GPS receiver 2.

The position obtaining unit 31 stores received position information in the SDRAM 13 (step S10a). When the user carries out photographing (Yes at step S11), real-time position information stored in the SDRAM 13 is recorded in the header of image data (Yes at steps S12 and S13).

When the position information is not captured at step S6 (No at step S6), the display control unit 34 checks whether recorded position information is recorded in the SDRAM 13 (step S14).

When the recorded position information is recorded (Yes at step S14), the display control unit 34 displays the recorded position information in blue on the operation display unit 18 (step S15).

When the recorded position information is not recorded at step S14 (No at step S14), the display control unit 34 displays a message that the recorded position information is not recorded on the operation display unit 18 (step S17).

The setting information can be provided as setting for automatic changeover to the real-time position information use mode, or as setting for not executing automatic changeover and recording nothing in the header of image data when the recorded position information is not recorded.

When the user carries out photographing (Yes at step S16), the mode control unit 33 refers to the setting information on the flash memory 16, checks which one of "OFF", "photograph number condition", and "timer condition" the mode change condition is set to, and proceeds to a process loop depending on each mode of the position information use mode (step S19). When the mode change condition is set to "OFF", mode changeover from "position information combined use mode" to "real-time position information use mode" is not carried out, and the recorded position information stored in the SDRAM 13 is recorded in the header of image data (steps S12 and 13).

When the mode change condition is set to "photograph number condition", whether the photograph number condition of one or more is set on the flash memory 16 is checked (step S20). When the photograph number condition is set to one or more (Yes at step S20), the photograph number information managed by the SDRAM 13 is incremented by one (step S21). When the photograph number information is incremented by one, whether the current count of the photograph number information is greater than the photograph number condition is checked (step S22). When the current count of the photograph number information is greater (Yes at step S22), the mode control unit 33 changes "position information combined use mode" to "real-time position information use mode" in changing the position information use mode (step S23). Then, the recorded position information is deleted from the SDRAM 13, and the system control proceeds to step S3. In this case, because the content of the SDRAM 13 is deleted, recorded position information is not recorded in image data when the user carries out photographing at step S16. At this time, the display control unit 34 can display a message that recorded position information is not recorded on the operation display unit 18.

When the photograph number condition of one or more is not set on the flash memory 16 (step S20) and when the current count of the photograph number information is equal to or less than the photograph number condition (step S22), mode changeover from "position information combined use mode" to "real-time position information use mode" is not carried out, and the recorded position information stored in the SDRAM 13 is recorded in the header of image data (steps S12 and 13).

When the mode change condition is set to "timer condition", whether the timer condition is set to any value other than zero on the flash memory 16 is checked (step S24). When the timer condition is set to any value other than zero (Yes at step S24), whether a time indicated by the elapsed time information managed by the SDRAM 13 reaches a time indicated by the timer condition is checked (step S25). When the time indicated by the current elapsed time information reaches the time indicated by the timer condition (Yes at step S25), the mode control unit 33 changes "position information combined use mode" to "real-time position information use mode" in changing the position information use mode (step S26). Then, the recorded position information is deleted from the SDRAM 13, and the system control proceeds to step S3. In this case, because the content of the SDRAM 13 is deleted, recorded position information is not recorded in image data when the user carries out photographing at step S16. At this time, the display control unit 34 can display a message that recorded position information is not recorded on the operation display unit 18.

When the timer condition of zero is set on the flash memory 16 (step S24) and when the time indicated by the current elapsed time information does not reach the time indicated by the timer condition (step S25), mode changeover from "position information combined use mode" to "real-time position information use mode" is not carried out, and the recorded position information stored in the SDRAM 13 is recorded in the header of image data (steps S12 and 13).

Figure 18:
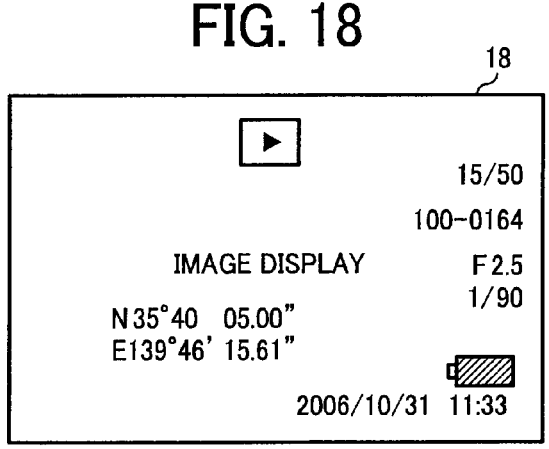
FIG. 18 is a schematic diagram of an example of an operation display unit on which image data including position information is displayed.

In the above manner, position information recorded in the Exif header of image data is displayed together with a captured image and other Exif data (International Organization for Standardization (ISO) speed, exposure, and the like) when the image data is displayed on the liquid crystal display of the operation display unit 18 by the display control unit 34. FIG. 18 is a schematic diagram of an example of the operation display unit 18 on which image data including position information is displayed. As shown in FIG. 18, the position information 1201 including an element of latitude and longitude is displayed together with the image data and other Exif data (ISO speed, exposure, and the like).

The digital camera 1 according to the first embodiment has operation modes of the recorded position information use mode and the position information combined use mode, in addition to the real-time position information use mode, and utilizes position information that has been obtained from the GPS and stored in the SDRAM 13. This enables recording of position information in the header of image data even in an indoor environment where the GPS receiver is unusable, which offers an effect of facilitating a user in recording position information in image data.

The digital camera 1 according to the present embodiment sets an automatic changeover condition in advance in "recorded information use mode", so that automatic mode changeover to the real-time position information use mode is executed after a specific number of photographs has been taken or a specific period has elapsed. This offers an effect of reducing a user's work.

Figure 19:
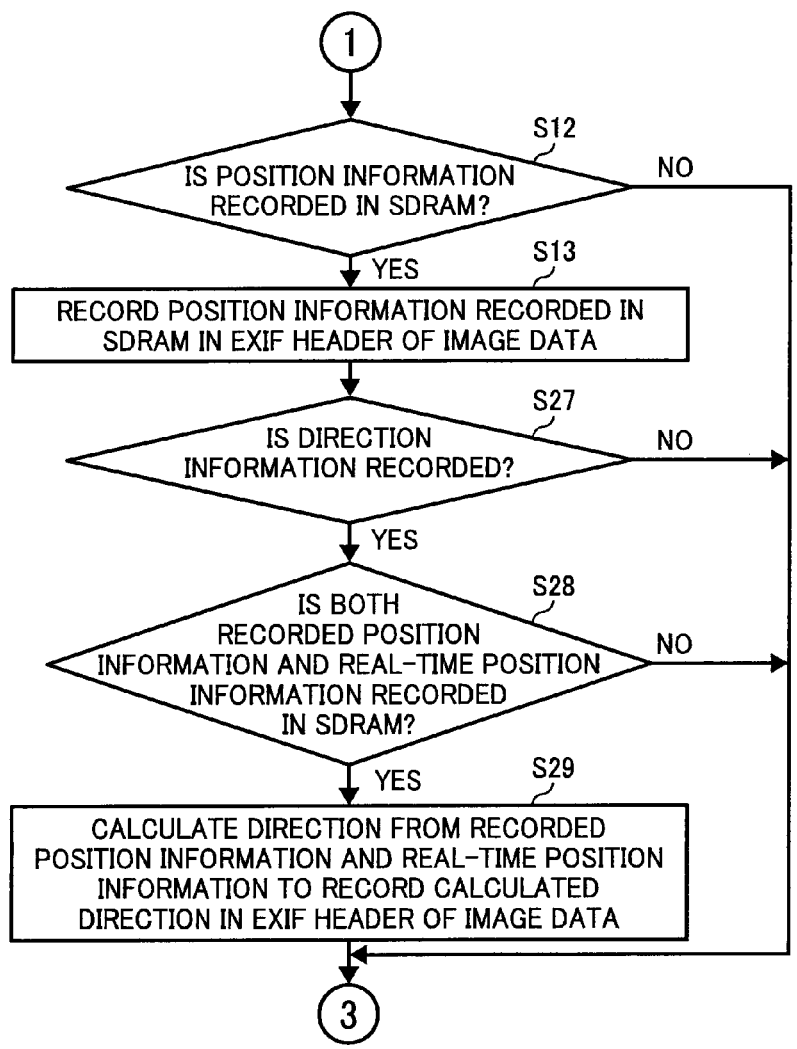
FIG. 19 is a flowchart of a procedure of a position information/direction information recording process executed by the digital camera according to the second embodiment.

An operation of the digital camera 1 of the second embodiment having the above configuration is explained. The digital camera 1 according to the second embodiment operates in the same manner as the digital camera 1 according to the first embodiment in the operational flow shown in FIGS. 16 and 17A to 17D, so that the operation of the digital camera 1 according to the second embodiment which is different from that of the digital camera 1 according to the first embodiment is explained. Referring to FIG. 19, a procedure of a process of recording direction information, in addition to position information, in the header of image data is explained.

Figure 16:
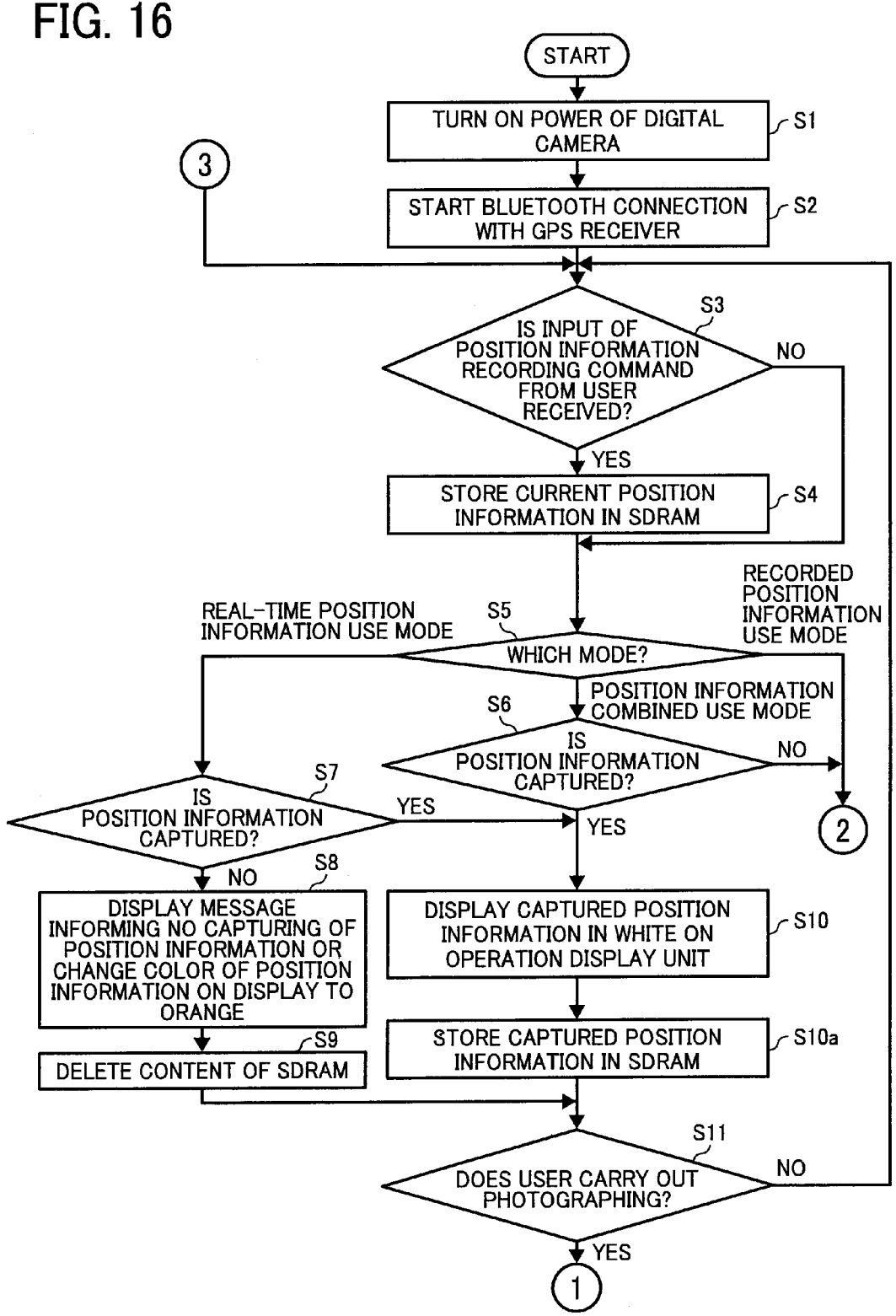
FIG. 16 is a flowchart of a procedure of a position information recording process executed by the digital camera according to the first embodiment.
Figure 17A:
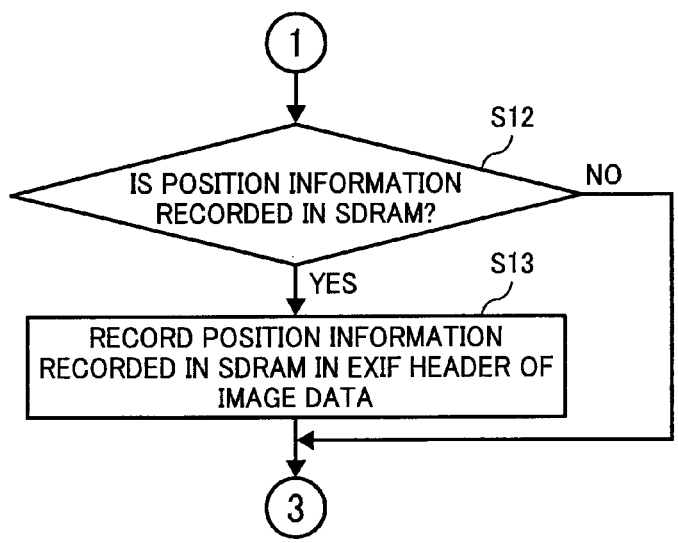
FIG. 17A is a flowchart of a procedure of the position information recording process executed by the digital camera according to the first embodiment.
Figure 17B:
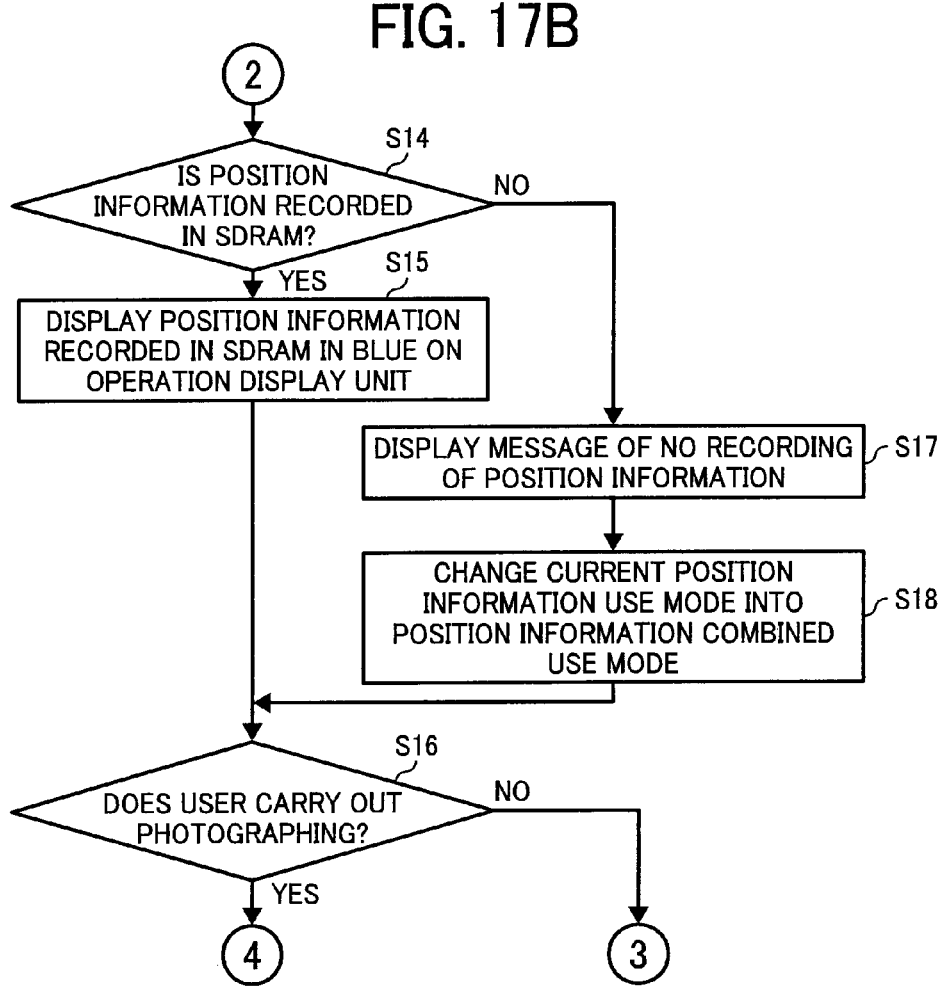
FIG. 17B is a flowchart of a procedure of the position information recording process executed by the digital camera according to the first embodiments.
Figure 17C:
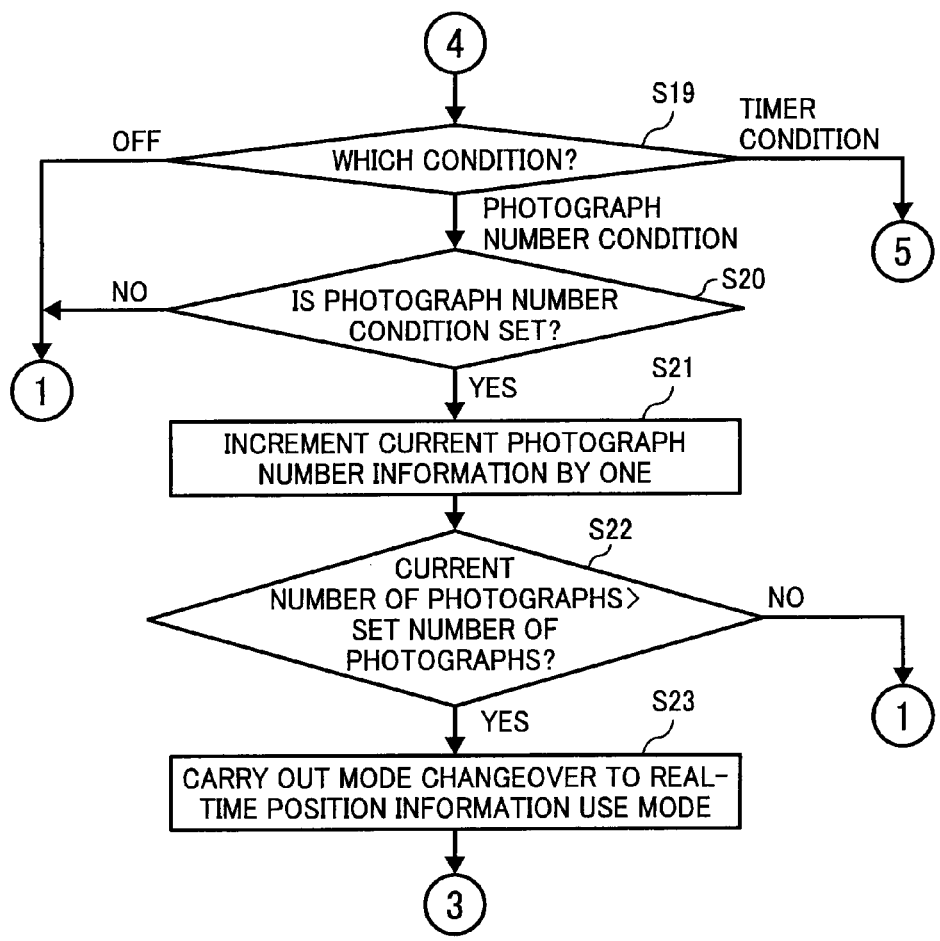
FIG. 17C is a flowchart of a procedure of the position information recording process executed by the digital camera according to the first embodiments.
Figure 17D:
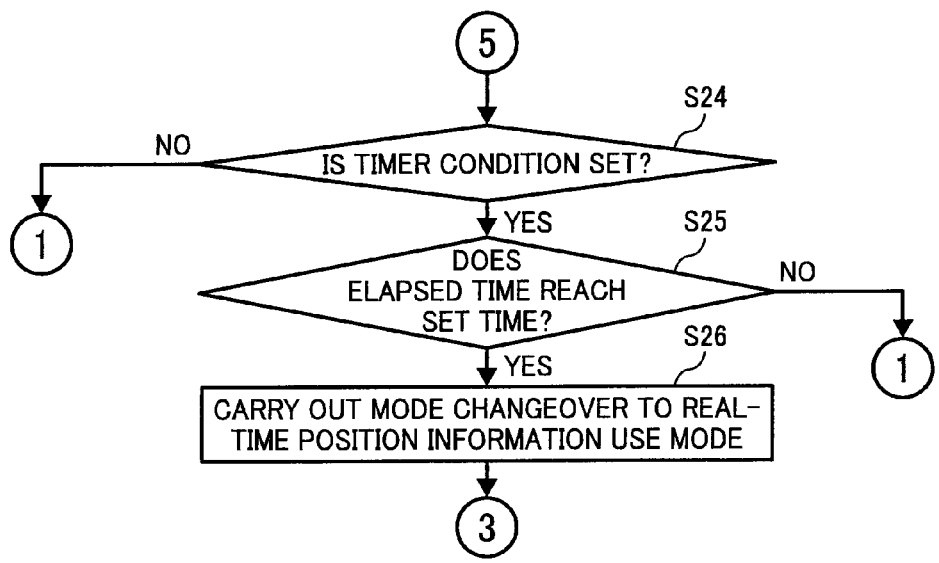
FIG. 17D is a flowchart of a procedure of the position information recording process executed by the digital camera according to the first embodiments.

When a user carries out photographing at step S11 of FIG. 16 or at step S16 of FIG. 17B (Yes at step S11 or at step S16), real-time position information or recorded position information stored in the SDRAM 13 is recorded in the header of image data (steps S12 and 13).

When the real-time position information or the recorded position information is recorded in the header of the image data, the mode control unit 33 refers to setting information on the flash memory 16, and checks the current setting of use or nonuse of the function of calculating and recording direction information (step S27). When the use of the function of calculating and recording direction information is set to "OFF" (No at step S27), direction information is not recorded, and the system control returns to step S3.

When the use of the function of calculating and recording direction information is set to "ON" (Yes at Step S27), the mode control unit 33 checks whether both real-time position information and recorded position information are recorded together in the SDRAM 13 (step S28). When either of the real-time position information and recorded position information is not recorded (No at step S28), the direction information is not recorded, and the system control returns to step S3. When the direction information is not recorded, the display control unit 34 can display a message informing a user that the direction information is not calculated and recorded on the operation display unit 18. When direction information calculated at the previous photographing is on display, for example, the color of position information containing the previously calculated direction information can be changed to orange to change a display form, thereby notifying the user of display of the previously calculated direction information.

When both real-time position information and recorded position information are recorded together (Yes at step S28), the direction calculating unit 36 calculates direction information from the real-time position information and recorded position information, and the direction recording unit 37 records the calculated direction information in the Exif header of image data (step S29).

According to the above configuration, the direction calculating unit 36 calculates the direction of a subject seen from a photographing position by calculating the direction from a position specified by real-time position information to a position specified by recorded position information. The direction calculating unit 36 can also calculate a direction in which a subject is facing by calculating the direction of a position specified by recorded position information from a position specified by real-time position information. In addition, according to the above configuration, directions can be calculated based on position information obtained by the position obtaining unit 31. This eliminates a need of mounting a digital compass or the like on the digital camera 1, thus enables cost reduction.

The digital camera 1 according to the above embodiments has a module configuration including the position obtaining unit 31, the position recording unit 32, the mode control unit 33, the display control unit 34, the input control unit 35, the direction calculating unit 36, the direction recording unit 37, and the elapsed time checking unit 38. Each module unit is generated on the main memory as the CPU (processor) reads and executes a computer program preinstalled in a ROM or the like.

A computer program executed in the digital camera 1 according to the above embodiments can be provided in such a way that the computer program is recorded as an installable format file or executable format file on such a computer-readable recording medium as a CD-ROM, a flexible desk (FD), a CD-R, and a DVD (Digital Versatile Disk).

Moreover, a computer program executed in the digital camera 1 according to the above embodiments can be provided in such a way that the computer program is stored in a computer connected to a network, such as the Internet, and is downloaded from the computer via the network, or that the computer program is supplied or distributed via a network, such as the Internet.

The present invention is not limited to the above embodiments in its application, but can be embodied in practical application through modification of constituent elements within the scope of the substance of the invention. A proper combination of a plurality of constituent elements disclosed in the above embodiments can create a variety of inventions. For example, some constituent elements can be excluded from all the constituent elements disclosed in the above embodiments, or constituent elements used across different embodiments can be combined properly.

According to one aspect of the present invention, a user is facilitated in recording position information in a header of image data. In addition, the convenience of the digital camera or the like is improved for a user.

According to another aspect of the present invention, the function of the digital camera is improved at low cost without mounting a digital compass on the digital camera.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-capturing apparatus, comprising:
a position obtaining unit that obtains position information indicative of a position of the image-capturing apparatus;
an instruction receiving unit that receives an instruction for storing of the position information;
a recorded position storing unit that stores therein the position information obtained by the position obtaining unit as first position information when the instruction receiving unit receives the instruction;
a real-time position storing unit that stores therein the position information obtained by the position obtaining unit as second position information when a photograph is taken;
a change condition setting unit that sets a change condition on timing of mode changeover from a recorded position information use mode for storing the first position information together with a captured-image, to a real-time position information use mode for storing the second position information together with the captured-image;
a mode control unit that executes mode changeover from the recorded position information use mode to the real-time position information use mode when a timing of mode changeover from the recorded position information use mode to the real-time position information use mode matches the change condition, wherein the mode control unit is configured to determine the mode based on the change condition set by the change condition setting unit; and
a storing unit that stores, based on the mode determined by the mode control unit, only one of the first position information and the second position information, together with the captured-image as image data, wherein the storing unit is further configured to store one of the recorded position information use mode and the real-time position information use mode as setting information in accordance with the mode determined by the mode control unit.

2. The image-capturing apparatus according to claim 1, wherein
the change condition setting unit sets a number of photographs taken after setting of the recorded position information use mode as the change condition, and
the mode control unit executes mode changeover from the recorded position information use mode to the real-time position information use mode when a number of photographs taken after setting of the recorded position information use mode matches the change condition.

3. The image-capturing apparatus according to claim 1, wherein
the change condition setting unit sets a time elapsed after setting of the recorded position information use mode as the change condition, and
the mode control unit executes mode changeover from the recorded position information use mode to the real-time position information use mode when a time elapsed after setting of the recorded position information use mode matches the change condition.

4. The image-capturing apparatus according to claim 1, further comprising:
a calculating unit that calculates direction information of a subject from the first position information and the second position information,
wherein the storing unit stores the direction information together with the first position information, the second position information, and the captured-image as the image data.

5. The image-capturing apparatus according to claim 4, further comprising a direction information setting unit that sets whether to store the direction information together with the first position information, the second position information, and the captured-image as the image data, wherein
the storing unit stores the direction information together with the first position information, the second position information, and the captured-image as the image data when the direction information setting unit sets storing of the direction information.

6. The image-capturing apparatus according to claim 5, further comprising a notifying unit that notifies a user that the calculating unit is unable to calculate the direction information.

7. The image-capturing apparatus according to claim 6, wherein the storing unit writes at least one of the first position information, the second position information, and the direction information on a header of the image data.

8. The image-capturing apparatus according to claim 5, wherein the storing unit writes at least one of the first position information, the second position information, and the direction information on a header of the image data.

9. The image-capturing apparatus according to claim 4, further comprising a notifying unit that notifies a user that the calculating unit is unable to calculate the direction information.

10. The image-capturing apparatus according to claim 9, wherein the storing unit writes at least one of the first position information, the second position information, and the direction information on a header of the image data.

11. The image-capturing apparatus according to claim 4, wherein the storing unit writes at least one of the first position information, the second position information, and the direction information on a header of the image data.

12. An image-capturing method that is implemented on an image forming apparatus, comprising:
obtaining position information indicative of a position of the image-capturing apparatus;
receiving an instruction for storing of the position information;
storing the position information obtained in the obtaining step as first position information when the instruction is received;
storing the position information obtained in the obtaining step as second position information when a photograph is taken;
setting a change condition on timing of mode changeover from a recorded position information use mode for storing the first position information together with a captured-image to a real-time position information use mode for storing the second position information together with the captured-image;
executing mode changeover from the recorded position information use mode to the real-time position information use mode when a timing of mode changeover from the recorded position information use mode to the real-time position information use mode matches the change condition, and determining the mode based on the set change condition; and
storing, based on the determined mode, only one of the first position information and the second position information, together with the captured-image as image data, and storing one of the recorded position information use mode and the real-time position information use mode as setting information in accordance with the determined mode.

13. The image-capturing method according to claim 12, further comprising:
setting a number of photographs taken after setting of the recorded position information use mode as the change condition; and
executing mode changeover from the recorded position information use mode to the real-time position information use mode when a number of photographs taken after setting of the recorded position information use mode matches the change condition.

14. The image-capturing method according to claim 12, further comprising:
setting a time elapsed after setting of the recorded position information use mode as the change condition; and
executing mode changeover from the recorded position information use mode to the real-time position information use mode when a time elapsed after setting of the recorded position information use mode matches the change condition.

15. The image-capturing method according to claim 12, further comprising:
calculating direction information of a subject from the first position information and the second position information; and
storing the direction information together with the first position information, the second position information, and the captured-image as the image data.

16. The image-capturing method according to claim 15, further comprising:
setting whether to store the direction information together with the first position information, the second position information, and the captured-image as the image data; and
storing the direction information together with the first position information, the second position information, and the captured-image as the image data when the direction information setting unit sets storing of the direction information.

17. The image-capturing method according to claim 15, further comprising notifying a user of a failure of the calculating direction information.

18. The image-capturing method according to claim 15, further comprising writing at least one of the first position information, the second position information, and the direction information on a header of the image data.

19. A non-transitory computer readable medium storing computer readable program codes that, when executed, cause an image-capturing apparatus to execute the steps of:
obtaining position information indicative of a position of the image-capturing apparatus;
receiving an instruction for storing of the position information;
storing the position information obtained in the obtaining step as first position information when the instruction is received;
storing the position information obtained in the obtaining step as second position information when a photograph is taken;
setting a change condition on timing of mode changeover from a recorded position information use mode for storing the first position information together with a captured-image to a real-time position information use mode for storing the second position information together with the captured-image;
executing mode changeover from the recorded position information use mode to the real-time position information use mode when a timing of mode changeover from the recorded position information use mode to the real-time position information use mode matches the change condition, and determining the mode based on the set change condition; and
storing, based on the determined mode, only one of the first position information and the second position information, together with the captured-image as image data, and storing one of the recorded position information use mode and the real-time position information use mode as setting information in accordance with the determined mode.

* * * * *